W. S. JESSUP, dec'd.

G. M. BALLARD & G. MINCHIN, Assignees of ADELIA M. JESSUP, Exr'x.

TRUNK-CLAMP.

No. 7,164. Reissued June 6, 1876.

Witnesses.

J. H. Sessions

Henry A. Mitchell

Inventor.

William S. Jessup, Dec'd,
Assignees.
George M. Ballard
George Minchin
By James Shepard Atty.

N. PETERS, PHOTO-LITHOGRAPHER, WASHINGTON, D. C.

UNITED STATES PATENT OFFICE.

GEORGE M. BALLARD AND GEORGE MINCHIN, OF NEWARK, NEW JERSEY, ASSIGNEES OF ADELIA M. JESSUP, EXECUTRIX OF WILLIAM S. JESSUP, DECEASED.

IMPROVEMENT IN TRUNK-CLAMPS.

Specification forming part of Letters Patent No. 89,773, dated May 4, 1869; reissue No. 7,164, dated June 6, 1876; application filed April 19, 1876.

*To all whom it may concern:*

Be it known that WILLIAM S. JESSUP, late of Newark, in the county of Essex and State of New Jersey, did invent a certain new and useful Improvement in Trunk-Clamps, of which the following is a full and exact description thereof, reference being had to the accompanying drawings, making part of this specification.

Figure 1:
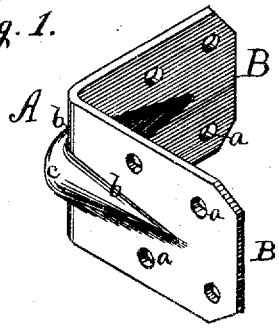
Figure 2:
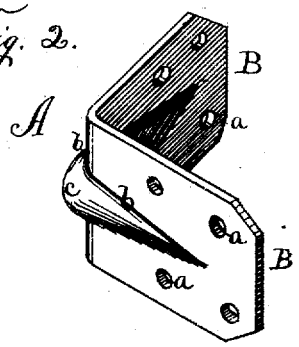
Figure 3:
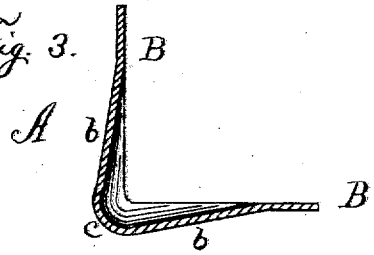

Figure 1 is a perspective view of said improved trunk-clamp; Fig. 2, a similar view, with the angle of the iron more obtuse than in Fig. 1, to adapt it to the bilge of the top or sides of the trunk; and Fig. 3, a longitudinal section of the same.

Like letters of reference indicate corresponding parts in all the figures.

The invention consists, as a new article of manufacture, of a trunk-clamp composed of two wings, and having a central rounded projection on each wing, for receiving the wear and contact to which the sides of the trunk are subjected; also, in extending said central rounded projection over the corner of the angle of the clamp, for giving it greater strength, and receiving the wear and contact to which the corners of the trunk are subjected, all as hereinafter described.

In the accompanying drawings, A indicates the clamp or corner-plate, which is made of malleable cast-iron, and is formed of two wings, B B, bent in angular form, and provided with holes *a a*, formed in flat seats upon the wings, by which the clamp is secured to the body of the trunk. A bead or central rounded projection, *b*, is formed on the wings B B of the clamp, which also extends around the corner to form the corner-projection *c*, as shown, which central and rounded projections *b c* project out sufficiently beyond the corners and sides of the trunk to receive the wear and concussion of their contact with other bodies. By central, as applied to the projections, the transverse direction of the wings is alone referred to, meaning by central projection that the projection on the wings is in the middle of them from side to side, and not from end to end. The projections, standing out as they do from a flat margin, also serve most effectually to give strength and rigidity to the clamp against any undue strain. The central rounded projections on the wings are rounded not only from side to side of the wings, but they are also rounded or tapered off in the direction of their length, so that they terminate before reaching the outer ends of the wings, and thereby leave ample room for a flat seat or surface, in which the rivet or screw holes *a a* are formed.

By this device the trunk is not only made much stronger, and the joints made more rigid than by the ordinary methods, but by means of the central rounded projection *b c* projecting out a little beyond the body, it receives the wear and concussion to which the trunk is subjected, and shields the same to a great degree. The central projection on the wings also serves, to a great degree, to prevent the trunk from being injured by friction against other trunks, or the sides of a baggage car or wagon, and thus insures to it preservation and durability.

What is claimed as the invention of WILLIAM S. JESSUP is—

A trunk-clamp composed of two wings, and having a central rounded projection projecting from each wing, substantially as described, and for the purpose specified.

GEORGE M. BALLARD.
GEORGE MINCHIN.

Witnesses:
J. FRANK FORT,
J. E. HOWELL.